US012697747B2

(12) United States Patent (10) Patent No.: US 12,697,747 B2

Thieme et al. (45) Date of Patent: Aug. 4, 2026

(54) POWER TOOL

(71) Applicant: Black & Decker, Inc., New Britain, CT (US)

(72) Inventors: Rene Thieme, Riesa (DE); Petr Dusik, Idstein (DE); Sneha Puthani, Idstein (DE); Joerg Schoesser, Selters (DE); Benjamin Schmidt, Mainz (DE); Ezio Ferrati, San Severino Marche (IT)

(73) Assignee: BLACK & DECKER, INC., New Britain, CT (US)

( * ) Notice: Subject to any disclaimer, the term of this patent is extended or adjusted under 35 U.S.C. 154(b) by 70 days.

(21) Appl. No.: 17/983,032

(22) Filed: Nov. 8, 2022

(65) Prior Publication Data

US 2023/0069581 A1 Mar. 2, 2023

Related U.S. Application Data

(63) Continuation of application No. PCT/EP2021/061822, filed on May 5, 2021.

(30) Foreign Application Priority Data

May 12, 2020 (GB) ..................................... 2006968

(51) Int. Cl.
  *B27C 5/00* (2006.01)
  *B23D 47/00* (2006.01)
  (Continued)

(52) U.S. Cl.
  CPC ................ *B27C 5/10* (2013.01); *B23D 47/00* (2013.01); *B25F 5/02* (2013.01)

(58) Field of Classification Search
  CPC ................................... B25F 5/029; B27C 5/10
  See application file for complete search history.

(56) References Cited

U.S. PATENT DOCUMENTS 3,926,264 A * 12/1975 Bardwell ............... G05D 17/02
                                                           318/434
6,161,629 A * 12/2000 Hohmann ............. B23P 19/102
                                                           173/183

(Continued)

FOREIGN PATENT DOCUMENTS

DE     102004063174 A1     7/2006
EP          3038073 A1     6/2016

(Continued)

OTHER PUBLICATIONS

International Search Report, dated Jul. 9, 2021, in corresponding application PCT/EP2021/061822.

(Continued)

*Primary Examiner* — Eyamindae C Jallow

(74) *Attorney, Agent, or Firm* — Rhonda L. Barton

(57) ABSTRACT

A power tool including a housing and motor assembly mounted in the housing electrically connected to an electrical power source. The power tool includes a main switch configured to actuate the power tool. The main switch is mounted on the housing and in electrical connection with the motor assembly and the electrical power source. A detachable remote switch is electrically connectable with the motor assembly and the electrical power source. The detachable remote switch is configured to remotely actuate the power tool when the remote switch is electrically connected to the motor assembly and the electrical power source.

25 Claims, 9 Drawing Sheets

(51) Int. Cl.
  B25F 5/02          (2006.01)
  B27C 5/10          (2006.01)

(56)                References Cited

U.S. PATENT DOCUMENTS 11,014,224  B2 *   5/2021  Dey, IV  .................. B25F 5/006
  2007/0247113  A1 *  10/2007  Huang  .................. H02J 7/0044
                                                         320/114
  2014/0008090  A1 *   1/2014  Kokinelis  ................. B25F 5/02
                                                          29/428
  2016/0354817  A1    12/2016  Friend et al.

FOREIGN PATENT DOCUMENTS

EP           3213880  A1    9/2017
  WO        2010144630  A1   12/2010

OTHER PUBLICATIONS

Combined Search and Examination Report, GB Application No.
2006968.8, Nov. 26, 2020, 12 pages, UK IPO.
International Preliminary Report on Patentability, PCT Application
No. PCT/EP2021/061822, Nov. 15, 2022, 11 pages, WIPO.

* cited by examiner

100

114

B

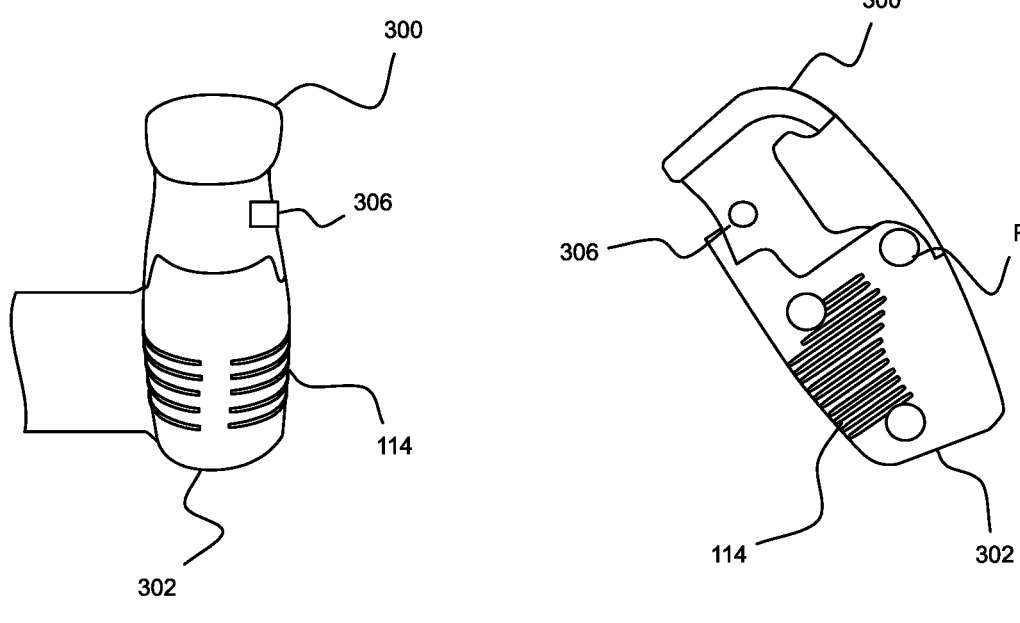
Figure 3a                                         Figure 3b

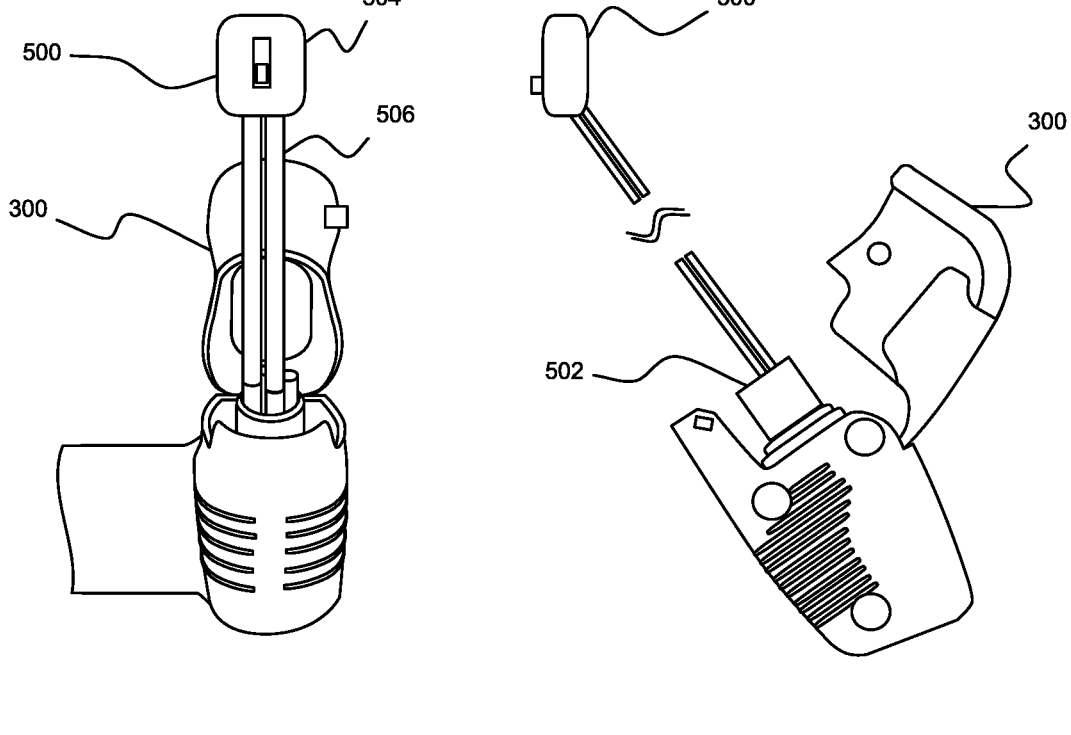
Figure 5a                    Figure 5b

800

800

POWER TOOL

CROSS-REFERENCE TO RELATED APPLICATIONS

The present application is a continuation of international patent application PCT/EP2021/061822, filed May 5, 2021, which claims priority from Great Britain Patent Application No. 2006968.8. filed May 12, 2020, the disclosures of which are incorporated herein by reference in their entirety

FIELD OF THE INVENTION

The present invention relates to a power tool. In particular the present invention relates to power tool with a connectable remote switch.

BACKGROUND OF THE INVENTION

A power tool such as a router may be utilized by tradesmen, craftsmen, hobbyists and other users to perform various tasks. For instance, a router may be used to perform intricate cutting projects, such as decorative profiles and trimming laminates on the edges or perimeters of a workpiece. A router also may be utilized to form grooved areas in woodworking and other material as well as to remove excess material on workpieces. Routers may utilize various types of cutting tools or router bits in order to perform these and other types of tasks.

A router normally comprises one or more handles allowing the user to grip the router during operation. This means that the user can manoeuvre the router with respect to the workpiece. This works well when the workpiece is large and fixed.

However, for some cutting operations with the router, users may wish to mount the router 100 on a worktable such that the workpiece may be moved with respect to the router. In this case, the router is normally inverted with the cutting blade pointing upwards. This means that smaller workpieces can be placed on the worktable and cut with the inverted router blade.

However, a problem with this arrangement is that the router main ON/OFF switch is locked in an ON position and then the user activates the router with a switch at a mains power socket. This means that the user may not be in the proximity of the router when turning the router on and off.

Examples of the present invention aim to address the aforementioned problems.

SUMMARY

According to an aspect of the present invention there is a power tool comprising: a housing; a motor assembly mounted in the housing electrically connected to an electrical power source; a main switch configured to actuate the power tool, the main switch being mounted on the housing and in electrical connection with the motor assembly and the electrical power source; and a detachable remote switch electrically connectable with the motor assembly and the electrical power source; wherein the detachable remote switch is configured to remotely actuate the power tool when the remote switch is electrically connected to the motor assembly and the electrical power source.

Optionally, the main switch and the remote switch are arranged in parallel.

Optionally, the main switch and the remote switch are arranged in series.

Optionally, the detachable remote switch is connected to the power tool via a socket or plug mounted on or in the housing.

Optionally, the detachable remote switch comprises a plug or socket connectable to the socket or plug mounted on the housing.

Optionally, the housing comprises a door movable between an open position and a closed position and when the door is in the open position, the detachable remote switch is connectable to the power tool.

Optionally, the door is selectively releasable from the housing.

Optionally, the movable door comprises an integrated contact for electrically connecting with the plug or socket mounted on the housing and closing an ON/OFF circuit of the power tool when the movable door is in the closed position.

Optionally, when the detachable remote switch is connected to the power tool, the main switch is disabled.

Optionally, when the door is in the open position, the main switch is disabled.

Optionally, the movable door is mounted in a handle of the power tool.

Optionally, when the movable door is in the open position, the handle cannot be gripped by the user.

Optionally, the main switch is configured to operate the power tool in a first operational mode.

Optionally, in the first operational mode a user manually holds the power tools.

Optionally, when the door is in the open position, the user is prevented from operating the power tool in the first operational mode.

Optionally, the remote switch is configured to be used in a second operational mode.

Optionally, in the second operational mode, the power tool is mountable on a worktable.

Optionally, the remote switch is mountable on the edge of a worktable.

Optionally, the main switch is lockable in a closed position when the remote switch is electrically connected to the motor assembly and the electrical power source.

Optionally, the power tool comprises a motor control module configured to detect a no volt condition of the power tool.

Optionally, the motor control module is configured to reset the main switch or the remote switch to OFF when the motor control module detects a no volt condition of the power tool.

Optionally, the power tool is a router, a circular saw, a reciprocating saw, a drill, an impact driver, a planar, a grinder, a sander, an oscillating tool, a jigsaw, and/or a handsaw.

Optionally, the power tool is a router comprising a first handle and a second handle.

Optionally, the electrical power source is a battery and/or mains electricity.

In a second aspect of the invention, there is provided a worktable for mounting a power tool comprising: at least one coupling for mounting the power tool to the worktable; a remote switch mounted on the worktable; wherein the remote switch is connectable with a plug or socket mounted on the housing of the power tool and is configured to remotely operate the power tool when the power tool is mounted on the worktable.

In a third aspect of the invention, there is provided a power tool worktable assembly comprising: a worktable comprising: at least one coupling for mounting a power tool to the worktable; a remote switch mounted to the worktable; and a power tool comprising: a housing mountable on the worktable; a motor assembly mounted in the housing electrically connected to an electrical power source; a main switch configured to actuate the power tool, the main switch being mounted in the housing in electrical connection with the motor assembly and the electrical power source; and a plug or socket in electric connection with the motor assembly and the electrical power source and connectable to the remote switch; wherein the remote switch is configured to remotely operate the power tool when the remote switch is connected to the plug or socket.

In a fourth aspect of the invention, there is provided a power tool comprising: a housing having at least one handle; a motor assembly mounted in the housing electrically connected to an electrical power source; wherein the at least one handle comprises a door movable between an open position and a closed position and when the door is in the open position a socket is exposed wherein the socket is electrically connected to the power source and connectable to an electric accessory.

In a fifth aspect of the invention, there is provided a power tool comprising: a housing; a motor assembly mounted in the housing electrically connected to an electrical power source; a main switch configured to actuate the power tool, the main switch being mounted on the housing and in electrical connection with the motor assembly and the electrical power source; and a port connectable with a detachable remote switch, the detachable remote switch being electrically connectable with the motor assembly and the electrical power source when connected to the port; wherein the detachable remote switch is configured to remotely actuate the power tool when the remote switch is connected to the port.

In a sixth aspect of the invention, there is provided a remote switch accessory for a power tool, the power tool having a motor assembly electrically connected to an electrical power source, the remote switch accessory comprising: a switch for remote operation of the power tool; and a plug or socket connectable to a port mounted on the power tool; wherein when the plug or socket is connected to the port, the switch is electrically connected with the motor assembly and the electrical power source and the switch is configured to remotely actuate the power tool.

Various other aspects and further embodiments are also described in the following detailed description and in the attached claims with reference to the accompanying drawings, in which:

BRIEF DESCRIPTION OF THE DRAWINGS

FIGS. 3a and 3b show a front view and a side view of a portion of a power tool according to an example in a first position;

FIGS. 5a and 5b show a front view and a side view of a portion of a power tool according to an example in a second position;

DETAILED DESCRIPTION

Figure 1:
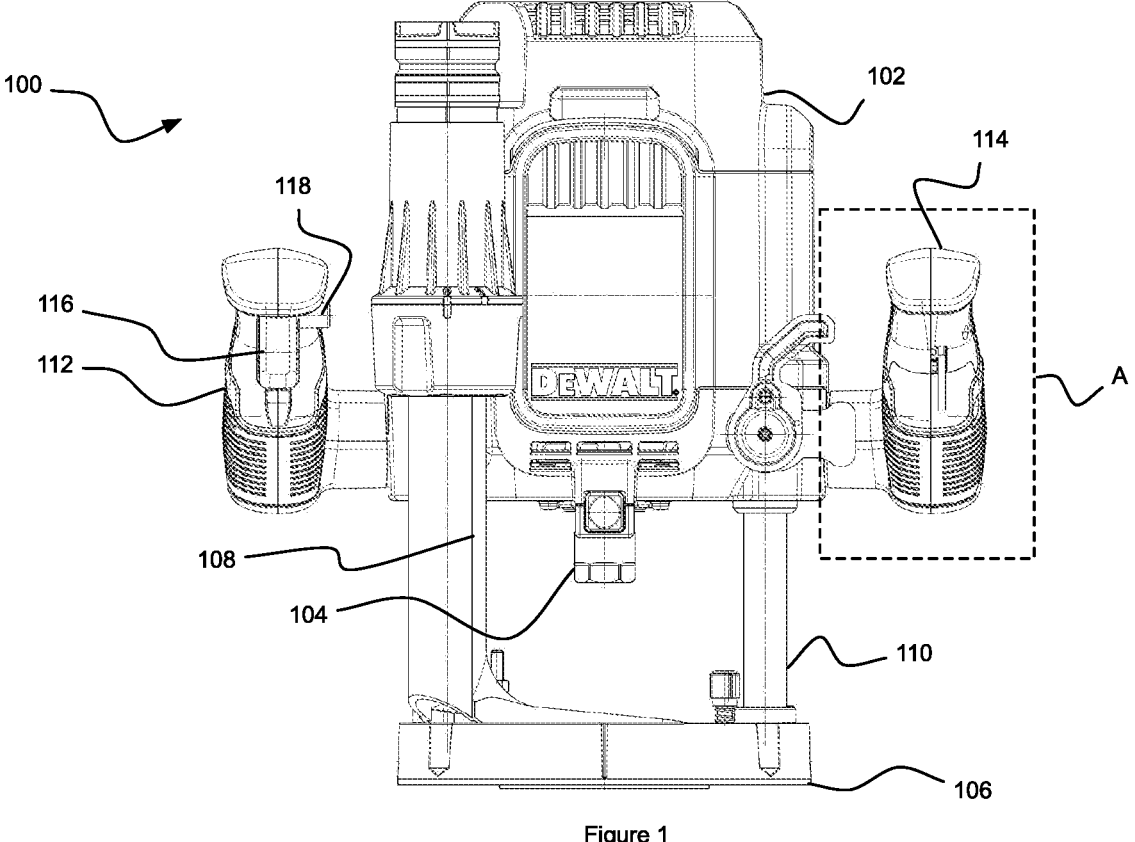
FIG. 1 shows a front view of a power tool according to an example.
Figure 2:
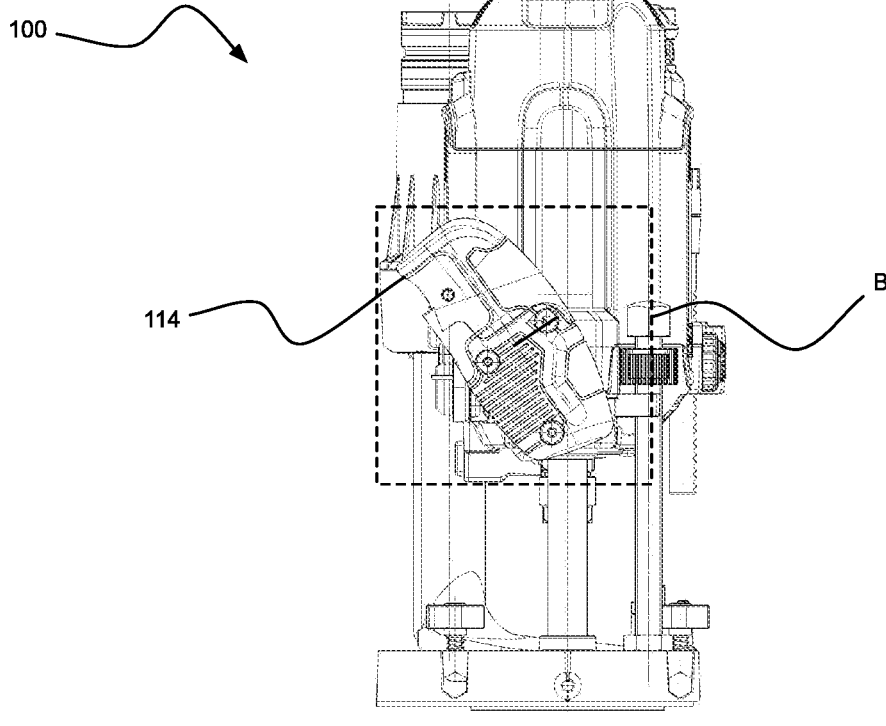
FIG. 2 shows side view of a power tool according to an example.

FIG. 1 shows a front view of a power tool 100 according to an example. FIG. 2 shows a side view of the power tool 100 according to the same example. The power tool 100 as shown in FIG. 1 is a router 100. Hereinafter, the power tool 100 will be referred to as a router 100, but in other examples any other type of power tool can be used.

The router 100 comprises a housing 102. The housing 102 comprises a clam shell type construction comprises two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown.

Figure 6:
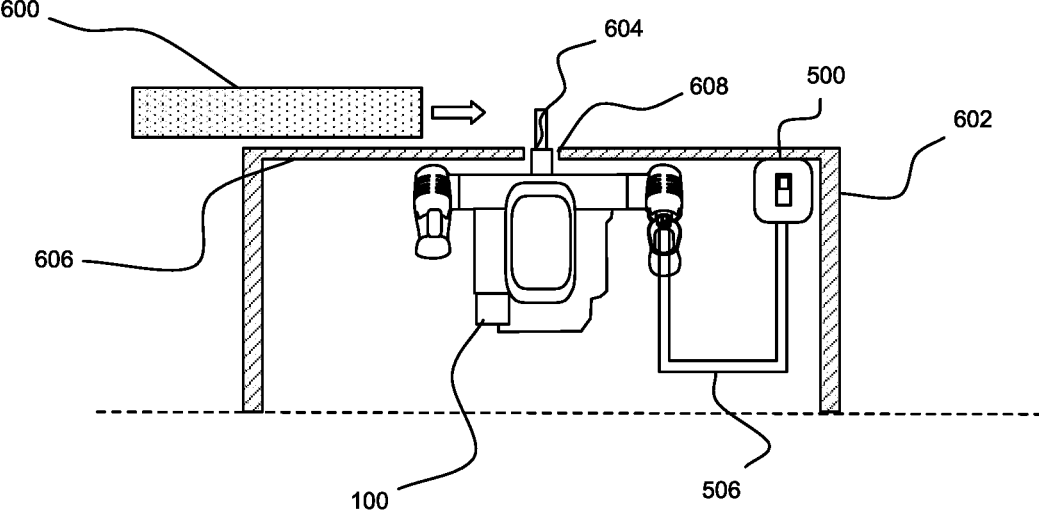
FIG. 6 shows a cross-sectional schematic side view of the power tool mounted on a worktable.
Figure 7A:
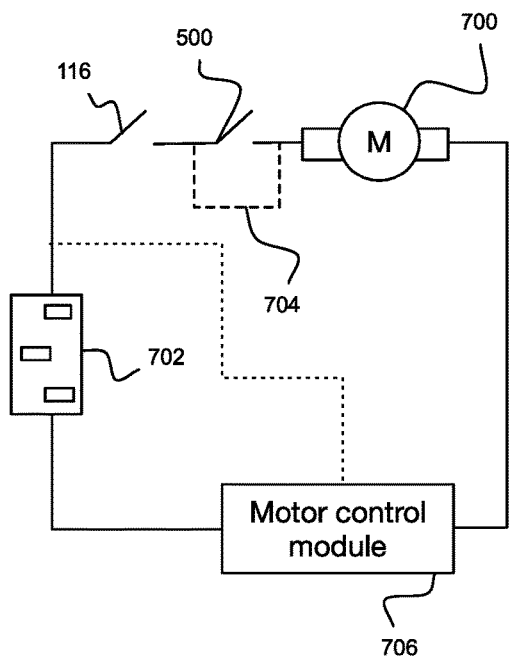
FIGS. 7a and 7b show circuit diagrams of the power tool.
Figure 7B:
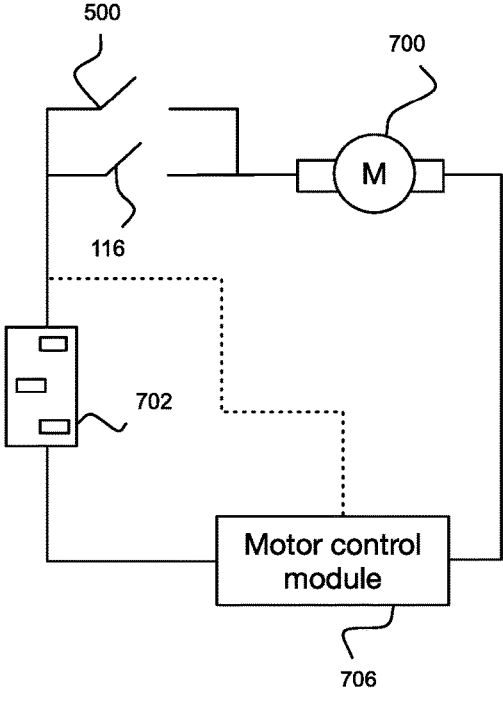

A motor 700 (as shown in FIGS. 7a, 7b) is mounted in the housing 102 for driving a collet 104. A cutting tool 604 (as shown in FIG. 6) is mounted in the collet 104 for engaging a workpiece 600 (as shown in FIG. 6).

As shown in FIG. 1 the router 100 comprises a base 106 for engaging the workpiece 600. The base 106 comprises an aperture through which the cutting tool 604 projects. The base 106 is mounted to the housing 102 via first and second supports 108, 110. The first and second supports 108, 110 are slidably mounted to the housing 102 for adjusting the relative distance of the base 106 from the collet 104. In some examples, the first and second supports 108, 110 are optionally removable. This means that the router 100 can be used without the base 106 engaging the workpiece 600.

The housing 102 comprises a first and second handle 112, 114 for the user to grip during operation. The first handle 112 comprises a main trigger switch 116 for operating the router 100. In some examples, the first handle 112 also comprises a lock button 118 for selectively locking the main trigger switch 116 into an "ON" status. This means that the user does not have to constantly keep pressure maintained on the main trigger switch 116 during operation of the router 100. In some examples, the main trigger switch 116 can be replaced with a momentary switch (not shown).

The motor 700 is electrically connected to an electric power source. In some examples, the electric power source is a mains electrical supply 702. In some other examples, the electrical power source is a battery (not shown). The battery can be removably mountable to the housing 102 or integral to the housing 102. In some examples, the router 100 can be powered either from both a battery source and/or a mains electrical supply 702.

The router 100 as shown in FIGS. 1 and 2 is shown in an upright position. In this upright position, the router 100 is operable in a first mode. In the first operational mode, the router 100 is manually operable whereby the use grips the first and second handles 112, 114 and moves the router 100 with respect to the workpiece 600. In the first operational mode, the workpiece 600 is fixed and the base 106 router 100 is brought into proximity of the workpiece 600 such that the base 106 and the cutting tool engage the workpiece 600.

In some circumstances, the user may wish to keep the router 100 fixed and move the workpiece 600 with respect to the router 100. In this case, the user operates the router 100 in a second operational mode. FIG. 6 shows the router 100 operating in a second mode whereby the router 100 is inverted and mounted to a worktable 602. The first and second supports 108, 110 and the base 106 have been optionally removed. Whilst FIG. 6 shows that the first and second supports 108, 110 and the base 106 have been removed, it other examples it is possible to keep the first and second supports 108, 110 and the base 106 fixed to the router 100. In this way, the router 100 is mounted adjacent to the underside surface 606 of the worktable 602. The router 100 is mounted to the worktable 602 with bolts, clips or any other suitable fastener (not shown) for fixing the router 100 with respect to the worktable 602. The cutting tool 604 projects through a hole 608 in the worktable 602. The cutting tool 604 is then engageable with the workpiece 600 when the workpiece 600 is positioned on the worktable 602 and moved towards the cutting tool 604.

In order to prevent the user from reaching underneath the worktable 602 and to allow the user to operate the router 100 close to worktable 602, the router 100 is operable with a remote switch 500. In some examples, the remote switch 500 is electrically connectable to the router 100.

The remote switch 500 will now be discussed in further detail with respect to FIGS. 3a, 3b, 4a, 4b, 5a, 5b, 6, 7, 8a and 8b.

FIGS. 3a, 3b show a front view and a side view of a portion of the router 100 according to an example in a first position. Specifically, FIGS. 3a and 3b are close up Figures of the dotted rectangles A and B as shown in FIGS. 1 and 2 respectively.

In some examples, the portion 300 of the router 100 is the second handle 114 as shown in FIGS. 1 and 2. In other examples, the portion 300 can be any part of the housing 102 of the router 100. The second handle 114 as shown in FIGS. 3a and 3b is in a first position. In the first position, the second handle 114 is suitable for gripping by the user. This means that the user can grip and operate the router 100 in the first mode of operation when the second handle 114 is in a first position.

In some examples, the second handle 114 comprises a movable door 300. The movable door 300 as shown in FIGS. 3a and 3b is in the closed position. In the closed position, the movable door 300 is adjacent to a lower handle portion 302. The movable door 300 is pivotally mounted to the lower handle portion 302 about pivot point P.

In some examples, the movable door 300 is selectively locked in the closed position adjacent to the lower handle portion 302. The movable door 300 is released from the closed position when the user presses the release button 306. The release button 306 is arranged to disengage a catch (not shown) from a catch aperture 400. In some examples, the movable door 300 is not held in the closed position with a catch mechanism. Instead, the pivot of the movable door 300 is sufficiently stiff, that frictional forces at the pivot point P of the movable door 300 hold the movable door 300 in position.

Figures 4A, 4B:
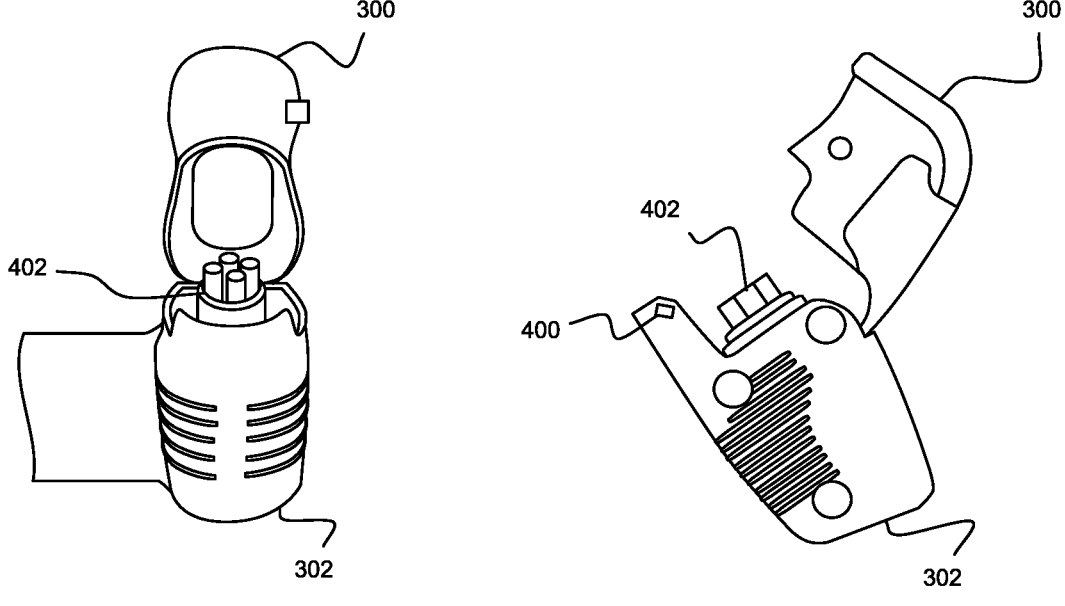
FIGS. 4a and 4b show a front view and a side view of a portion of a power tool according to an example in a second position.

Once the release button 306 has been depressed, the user can pivot the movable door 300 about the lower handle portion 302 as shown in FIGS. 4a, 4b. The movable door 300 as shown in FIGS. 4a, 4b is in a second open position. In the second position, the router 100 is arranged to be used in the second operational mode.

As shown in FIGS. 4a, and 4b, once the movable door 300 is in the open position, an electrical connector 402 is revealed. In some examples, the electrical connector 402 can be a socket or port 402 for engaging with a plug 502 (as shown in FIG. 5b) of an electrical accessory. In some other examples, the electrical connector 402 is a plug for engaging with a socket of an electrical accessory. In other examples, the electrical connector 402 can be any suitable connector for electrically connecting an electrical accessory to the router 100. Hereinafter, the electrical connector 402 will be referred to as a socket 402.

In some examples, the movable door 300 is a slidable door. In this way, the movable door 300 can be mounted on the housing 102 and the movable door 300 can be slid into an open position to reveal the socket 402 which is mounted elsewhere on the router 100. For example, the socket 402 can be mounted within the housing 102 adjacent to the motor 700.

The movable door 300 allows the socket 402 to be hidden or revealed according to the mode of operation of the router 100. This means that the socket 402 can be hidden when the user is manually operating the router 100 which may help preventing debris from clogging the socket 402.

Figure 8A:
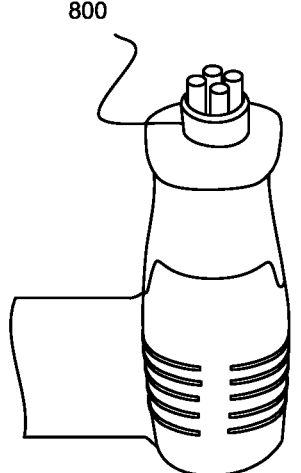
FIGS. 8a and 8b show a front view and a side view of a portion of a power tool according to an example.
Figure 8B:
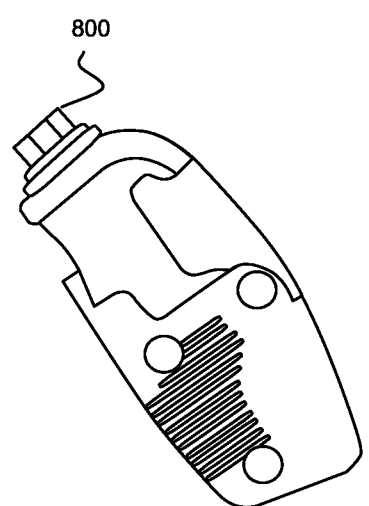

In other examples, there is no movable door 300 as shown in FIGS. 8a, and 8b. FIGS. 8a and 8b show a front view and a side view of a portion of a router 100 according to an example. The router 100 as shown in FIGS. 8a, 8b is identical to the router 100 as shown in reference to the other Figures. However, there is no movable door. Instead, the electrical connector 800 is mounted on the surface of the housing 102. This means that an electrical accessory can be plugged directly into the socket 800 mounted on the surface of the housing 102. If the arrangement as shown in FIGS. 8a and 8b is used with a series connection as described below with reference to FIGS. 7a, then an integrated contact is needed to close the circuit of the socket 402. For example, this may be a cap (not shown) for covering the socket 402 with one or more contacts for electrically connecting to the socket 402.

Once the movable door 300 is in the open position, an electrical accessory 500 can be electrically connected to the socket 402 as shown in FIGS. 5a and 5b. FIGS. 5a and 5b show a front view and a side view of a portion of the router 100 according to an example with the movable door 300 in the second position. FIGS. 5a and 5b are the same as FIGS. 4a and 4b except the electrical accessory 500 is connected to the socket 402. In some examples the electrical accessory 500 is a remote switch 500. However, in other examples, the electrical accessory can be other electrical accessories for aiding the user in operating the router 100. For example, the electrical accessory can be a light for illuminating the workpiece. Alternatively, the electrical accessory can be a sensor for detecting a parameter of the working environment (e.g., heat, humidity, smoke etc) or the workpiece. Hereinafter, the electrical accessory 500 will be referred to as a remote switch 500.

The remote switch 500 will be discussed in further detail in reference to FIGS. 6 and 7a and 7b. FIG. 6 shows a cross-sectional schematic side view of the router 100 mounted on a worktable 602. FIGS. 7a and 7b show circuit diagrams of the router 100.

When the remote switch 500 is electrically connected to the socket 402, the remote switch is electrically connected to the power source 702 and the motor 700 of the router 100. This means that the user can turn the router 100 on and off using the remote switch 500. This is advantageous because the remote switch 500 can be positioned closer to the working position of the user. Accordingly, the user does not have to leave the vicinity of the router 100 whilst the router 100 is in operation. Similarly, the user does not have to reach underneath the worktable 602 to access the main trigger switch 116.

As shown in FIG. 6, in some examples the remote switch 500 is optionally mounted to the edge of the worktable 602 in the second operational mode. The remote switch 500 can comprise a switch body 504 and a cable 506 extending between switch body 504 and the socket 402 on the router 100 mounted underneath the worktable 602. In some examples, the cable 506 can be integrated into the worktable 602. Alternatively, the cable 506 can be an additionally electrical accessory for connecting the router 100 and the remote switch 500 once the router 100 is mounted to the worktable 602.

Whilst FIG. 6 shows that the remote switch 500 is mounted to the edge of the worktable 602 in the second operational mode, the remote switch 500 can be located in other positions such as in the middle of the worktable 602, underneath the worktable 602 or any other suitable position on the worktable 602. The location of the remote switch 500 on the worktable 602 depends on the size and form of the worktable 602. In some examples, the remote switch 500 remains within easy reach of the user so that the router 100 can be switched off quickly in an emergency.

In a first example, the main trigger switch 116 and the remote switch 500 are arranged in series as shown in FIG. 7a. If the main trigger switch 116 and the remote switch 500 are arranged in series, then the main trigger switch 116 is locked into an always "ON" position. In this way, when the user actuates the remote switch 500, all the switches 116, 500 in the circuit are closed and the router 100 is turned ON. The router 100 is thereby operational in the second mode of operation.

If the main trigger switch 116 and the remote switch 500 are arranged in series, then the circuit will remain open so long as the movable door 300 is in the open position. In some examples, the movable door 300 comprises an integrated contact (not shown) on the inside surface for electrically connecting to the socket 402 when the movable door 300 is moved into the closed position. In this way, the integrated contact closes the ON/OFF power circuit of the router 100 about the socket 402. This means that the main trigger switch 116 closes the circuit when actuated and the router is turned ON. The router 100 is thereby operational in the first mode of operation.

In a second example, the main trigger switch 116 and the remote switch 500 are arranged in parallel as shown in FIG. 7b. If the main trigger switch 116 and the remote switch 500 are arranged in parallel, then either the main trigger switch 116 or the remote switch 500 can actuate the router 100. In this way the main trigger switch 116 or the remote switch 500 can be used to operate the router 100 in the first operational mode or the second operational mode respectively.

In some examples, the router 100 comprises a motor control module 706. The motor control module 706 is configured to control the motor 700 in dependence of one or more parameters. In some examples, the motor control module 706 detects that the router 100 has received a power outage. For example, the router 100 may have been disconnected from the mains power supply. In this case, the motor control module 706 detects a "no-volt" condition of the router 100. Accordingly, the motor control module 706 prevents the router 100 from restarting when the power source is reconnected to the router 100. In some examples, the motor control module 706 trips a no-volt release switch (not shown). The user must then reset the no-volt release switch before the router 100 can be operated. This means that the user cannot return to the router 100 and accidentally turn the router 100 on following a power outage (e.g., unplugging and plugging the mains cable from the mains electricity supply). Alternatively, the motor control module 706 resets the main trigger switch 116 and/or the remote switch 500 to OFF when the motor control module 706 detects a no-volt condition of the router 100.

In the event that the motor control module 706 detects a "no-volt" condition of the router 100, then main trigger switch 116 needs to be cycled. The user may have set the main trigger switch 116 locked in the ON position. When the power is provided to the router 100 again, the no-volt detection by the motor control module 706 prevents the unsafe and unintended start of the router 100. Accordingly, the user needs to cycle the main trigger switch 116 by switching the router 100 off and on to start up the router 100 again.

In some examples, where the router 100 has an integrated lock-on for the main trigger switch 116 and no-volt release detection, the motor control module 706 is also configured to detect a no-volt condition for the remote switch 500 when connected to the socket 402. In this way, the motor control module 706 can detect the no-volt condition for both the main trigger switch 116 and the remote switch 500.

In some other examples, router 100 has a momentary main power switch 116 which only actuates the router 100 when depressed. Accordingly in some examples, the motor control module 706 does not need to determine a no-volt condition in the first mode of operation. In this case, the motor control module 706 is configured to determine a no-volt condition for the remote switch 500. In other words, the motor control module 706 determines a no-volt condition of the router 100 when in the second mode of operation. This means that similarly, if the router 100 experiences a power outage whilst being used with the remote switch 500, the user must then reset the no-volt release switch before the router 100 can be operated.

In some examples, when the remote switch 500 is connected to the router 100, the main power switch 116 is disabled. "Disabled" in this context means that the main power switch 116 cannot be used to operate the router. In one example, the power switch 116 may be disabled by not electrically connecting it to the motor 700 or power source 702. In another example, power switch 116 may be coupled to a controller, which controls the operation of the router. The controller can detect when the remote switch 500 is connected to the router 100 and controls operation of the router based on signals from the remote switch 500 instead of the power switch 116. Accordingly, when the main power switch 116 is disabled, the main power switch 116 cannot actuate the router 100. This means that the user is not able to operate the router 100 with the main power switch 116 when the router 100 is in the second operational mode. In other words, the user can only operate the router 100 with the remote switch 500 when the remote switch 500 is connected to the router 100. Additionally, or alternatively, in some examples when the movable door 300 is in the open position, the main power switch 116 is disabled. By disabling the main power switch 116 in response to the remote switch 500 being connected or the movable door 300 being in the open position, the router 100 is safer because the user cannot operate the router 100 when configured in the second operational mode (e.g., inverted and mounted on a worktable 602.

By placing the movable door 300 on the second handle 114, the user is prevented from gripping the second handle 114 when the movable door 300 is in the open position. This is because the second handle 114 is ungrippable or uncomfortable when the movable door 300 is in the open position. For example, when the movable door 300 is in the open position, the second handle 114 comprises a plurality of ridges, projections and edges which are uncomfortable to grip or prevent gripping of the second handle 114. In this way, when the router 100 is configured for the second operational mode, the position of the movable door 300 with respect to the second handle 114 creates a physical lock-out. Accordingly, the physical position of the movable door 300 in the open position prevents the user operating the router 100 in the first operational mode (e.g., manually gripping both the first and second handles 112, 114).

Figure 9:
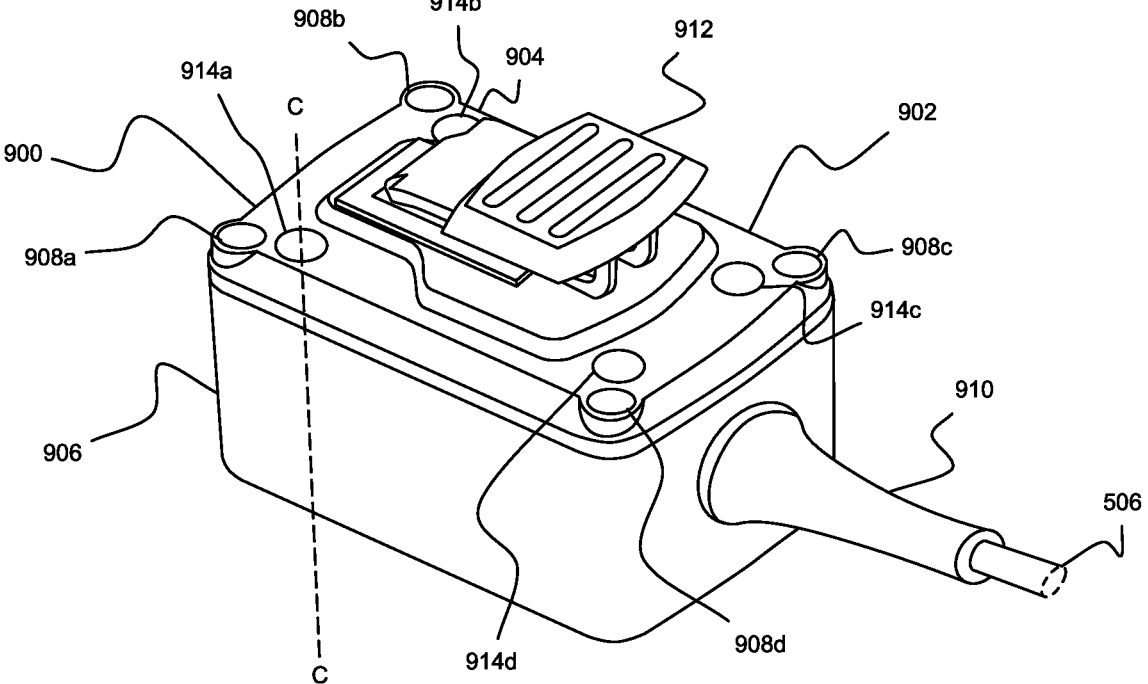
FIG. 9 shows a perspective view of a remote switch according to an example.

Turning to FIG. 9, another example of the remote switch 900 will now be discussed. The remote switch 900 is the same as the remote switch 500 discussed in reference to the previous Figures and operates in the same way.

The remote switch 900 as shown in FIG. 9 comprises a cable 506 which is represented partially in FIG. 9. The cable 506 is connected to the router 100 in the same way as previously discussed.

The remote switch 900 comprises a switch housing 902 having an upper switch housing 904 and a lower switch housing 906. The upper switch housing 904 and the lower switch housing 906 are fastened together with screws (not shown). The screws are each received in a screw recess 908a, 908b, 908c, 908d.

The cable 506 is optionally surrounded by a cable protector 910 which is mounted to the lower switch housing 906. The cable 506 is optionally clamped to the inside surface (not shown) of the lower switch housing 906 after the cable 506 exits the cable protector 910.

The remote switch 900 comprises a rocker switch 912 for switching the router 100 ON and OFF. The rocker switch 912 is mounted in the upper switch housing 904.

The switch housing 902 comprises a plurality of open bores 914a, 914b, 914c, 914d for receiving a screw fastener (not shown). This means that the screw fasteners can be threaded through the plurality of open bores 914a, 914b, 914c, 914d and secured to the worktable 602 parallel to the axis C-C. Accordingly, the user can position the remote switch 900 in a convenient location on the worktable 602.

In another embodiment two or more embodiments are combined. Features of one embodiment can be combined with features of other embodiments.

Whilst the power tool 100 as shown in the Figures is a router 100, in other examples other types of power tool can be used. For example, the arrangement as shown in the Figures for remote switching of the power tool 100 can be used together with one or more of the following a circular saw, a reciprocating saw, a drill, a planar, an impact driver, a grinder, a sander, an oscillating tool, a jigsaw, and/or a bandsaw or any other suitable power tool.

Embodiments of the present invention have been discussed with particular reference to the examples illustrated. However, it will be appreciated that variations and modifications may be made to the examples described within the scope of the invention.

The invention claimed is:

1. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, and wherein the main switch and the detachable remote switch are arranged in one of parallel and series.

2. A power tool according to claim 1 wherein the power tool is a router, a circular saw, a reciprocating saw, a drill, an impact driver, a planar, a grinder, a sander, an oscillating tool, a jigsaw or a bandsaw.

3. A power tool according to claim 1 wherein the electrical power source is one of a battery and mains electricity.

4. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, and wherein the detachable remote switch is connected to the power tool via at least one of a socket and a plug mounted on the housing.

5. A power tool according to claim 4 wherein the detachable remote switch comprises at least one of a plug and a socket connectable to the socket or plug mounted on the housing.

6. A power tool according to claim 4 wherein the housing comprises a door moveable between an open position and a closed position and when the door is in the open position, the detachable remote switch is connectable to the power tool.

7. A power tool according to claim 6 wherein the door is selectively releasable from the housing.

8. A power tool according to claim 6 wherein the door comprises an integrated contact for electrically connecting with at least one of the plug and the socket mounted on the housing and closing an ON/OFF circuit of the power tool when the door is in the closed position.

9. A power tool according to claim 6 wherein when the detachable remote switch is connected to the power tool, the main switch is disabled.

10. A power tool according to claim 6 wherein when the door is in the open position, the main switch is disabled.

11. A power tool according to claim 6 wherein the door is mounted in a handle of the power tool.

12. A power tool according to claim 11 wherein when the door is in the open position, the handle cannot be gripped by the user.

13. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, wherein the main switch is configured to operate the power tool in a first operational mode, wherein the housing comprises a door moveable between an open position and a closed position and when the door is in the open position, the detachable remote switch is connectable to the power tool, and wherein when the door is in the open position, the user is prevented from operating the power tool in the first operational mode.

14. A power tool according to claim 13 wherein in the first operational mode a user manually holds the power tool.

15. A power tool according to claim 13 wherein the detachable remote switch is configured to be used in a second operational mode.

16. A power tool according to claim 15 wherein in the second operational mode, the power tool is mountable on a worktable.

17. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, and wherein the detachable remote switch is mountable on the edge of a worktable.

18. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source, wherein the detachable remote switch is configured to remotely actuate the power tool when the detachable remote switch is electrically connected to the motor assembly and the electrical power source, and wherein the main switch is lockable in a closed position when the detachable remote switch is electrically connected to the motor assembly and the electrical power source.

19. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, wherein the power tool comprises a motor control module configured to detect a no volt condition of the power tool, and wherein the motor control module is configured to reset the main switch or the detachable remote switch to OFF when the motor control module detects a no volt condition of the power tool.

20. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a detachable remote switch electrically connectable with the motor assembly and the electrical power source;

wherein the detachable remote switch is configured to remotely actuate the power tool when the detachable remote switch is electrically connected to the motor assembly and the electrical power source, and wherein the power tool is a router comprising a first handle and a second handle.

21. A worktable for mounting a power tool comprising:

at least one coupling for mounting the power tool to the worktable;

a remote switch mounted on the worktable;

wherein the remote switch is connectable with at least one of a plug and a socket mounted on the housing of the power tool and is configured to remotely operate the power tool when the power tool is mounted on the worktable.

22. A power tool worktable assembly comprising:

a worktable comprising:

at least one coupling for mounting a power tool to the worktable;

a remote switch mounted to the worktable; and a power tool comprising:

a housing mountable on the worktable;

a motor assembly mounted in the housing electrically connected to an electrical power source;

a main switch configured to actuate the power tool, the main switch being mounted in the housing in electrical connection with the motor assembly and the electrical power source; and at least one of a plug and a socket in electric connection with the motor assembly and the electrical power source and connectable to the remote switch;

wherein the remote switch is configured to remotely operate the power tool when the remote switch is connected to the plug or socket.

23. A power tool comprising:

a housing having at least one handle;

a motor assembly mounted in the housing electrically connected to an electrical power source;

wherein the at least one handle comprises a door moveable between an open position and a closed position and when the door is in the open position a socket is exposed wherein the socket is electrically connected to the power source and connectable to an electric accessory.

24. A power tool comprising:

a housing;

a motor assembly mounted in the housing electrically connected to an electrical power source;

a main switch configured to actuate the power tool, the main switch being mounted on the housing and in electrical connection with the motor assembly and the electrical power source; and a port connectable with a detachable remote switch, the detachable remote switch being electrically connectable with the motor assembly and the electrical power source when connected to the port;

wherein the detachable remote switch is configured to remotely actuate the power tool when the detachable remote switch is connected to the port.

25. A remote switch accessory for a power tool, the power tool having a motor assembly electrically connected to an electrical power source, the remote switch accessory comprising:

a switch for remote operation of the power tool; and at least one of a plug and a socket connectable to a port mounted on the power tool;

wherein when at least one of the plug and the socket is connected to the port, the switch is electrically connected with the motor assembly and the electrical power source and the switch is configured to remotely actuate the power tool.

* * * * *